Jan. 12, 1926.
L. J. SMITH
1,569,308
PISTON FOR PUMPS
Filed Feb. 9, 1925
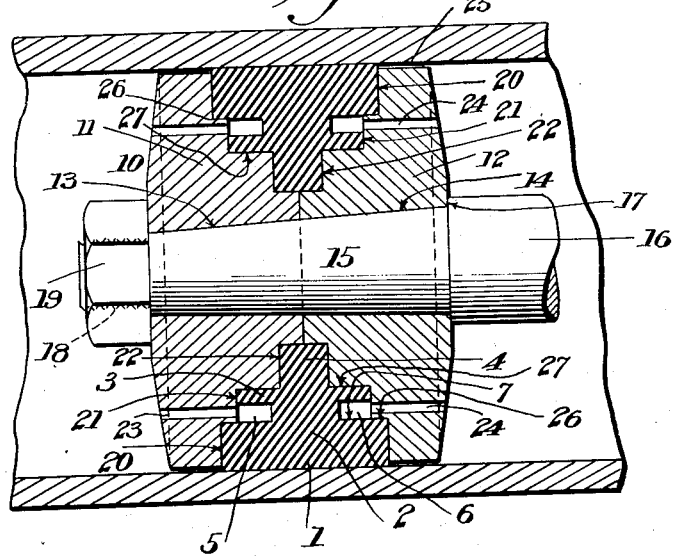
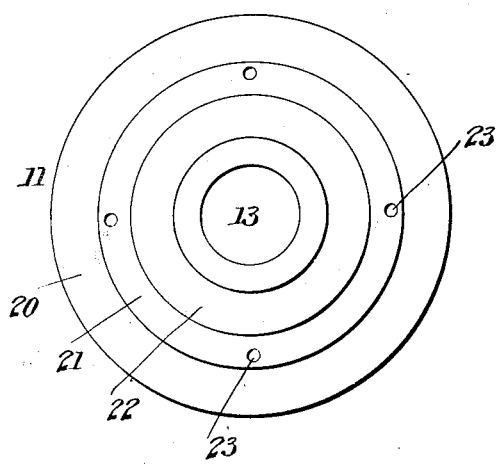
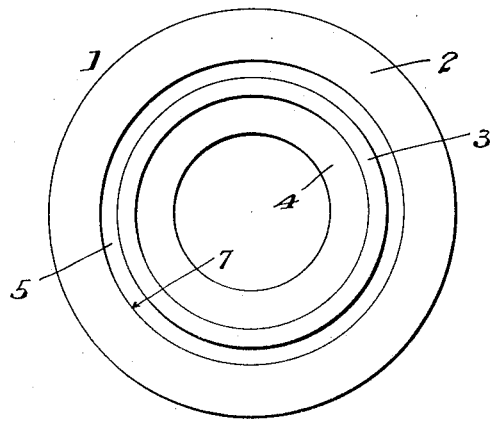
INVENTOR.
Louis J. Smith
BY
Robt. W. Pearson
ATTORNEY.

Patented Jan. 12, 1926.

1,569,308

UNITED STATES PATENT OFFICE.

LOUIS J. SMITH, OF TORRANCE, CALIFORNIA.

PISTON FOR PUMPS.

Application filed February 9, 1925. Serial No. 7,869.

*To all whom it may concern:*

Be it known that I, LOUIS J. SMITH, a citizen of the United States, residing at Torrance, in the county of Los Angeles and State of California, have invented certain new and useful Improvements in Pistons for Pumps, of which the following is a specification.

This invention relates to piston packings and more particularly to packings for water pump pistons.

The general object of my invention is to provide an improved expansible packing for water pump pistons which will readily expand to fit the pump cylinder wall and take up the wear between the piston and cylinder, and will expand at its forward edge and wipe the cylinder wall clean ahead of the piston, whereby grit is prevented from entering between the piston and cylinder and wearing the same.

A more particular object is to provide a pump piston packing of the character stated which will be simple in construction, inexpensive and efficient, and which may be readily assembled and adjusted.

Other objects and advantages will be more manifest in the following specification for an embodiment of the invention illustrated in the annexed drawing, in which:

Fig. 1 is a longitudinal section of a water pump piston and a packing, embodying my invention.

Fig. 2 is an inside face view of one of the piston members.

Fig. 3 is an end view of my packing.

Corresponding reference characters designate corresponding parts in all the views.

My packing, indicated 1, is made of resilient material, such as rubber, and is of cylindrical ring shape, formed with an outer annular body 2, an internal intermediate annular flange 3 of less thickness than said body projecting inwardly therefrom, an internal annular flange 4 projecting inwardly from the flange 3 midway thereof and a less thickness than said latter flange, and a pair of annular grooves 5 and 6 in the side faces respectively of the flange 3, the outer annular walls 7 of said grooves coinciding with the inner wall of the body 2 of the packing.

A water pump piston 10, constructed to carry my packing, is split midway between its ends into two members 11 and 12. The member 11 is provided with an axial conical bore 13 and the member 12 is provided with an axial conical bore 14 which bores receive the conical end 15 of a piston rod 16, said rod being formed with an annular shoulder 17 at the base of the conical end 15 for engaging the outer end of the member 12, and a thread 18 being provided on the extremity of said conical end to receive a nut 19 which engages the outer end of the member 11 for drawing the piston members 11 and 12 together. The members 11 and 12 are each formed with a plurality of annular rabbets 20, 21 and 22 of progressively decreasing depths and diameters, thus forming shoulders 26 and 27 between the said rabbets 20—21 and 21—22 respectively, the rabbets 20 extending inwardly from the periphery of the members and the rabbets 21 and 22 extending inwardly respectively from the rabbets 20 and 21. The members 11 and 12 are provided with ports 23 and 24 extending longitudinally from their outer ends into the rabbets 21 in said members respectively.

My packing 1 fits between the members 11 and 12, with the body 2 fitted in the rabbets 20 and supported on the shoulders 26 of said rabbets, the flange 3 fitting in the rabbets 21 and on the shoulders 27, and the flange 4 fitting in the rabbets 22, with the grooves 5 and 6 adjacent the inner ends of the ports 23 and 24, between the said body 2 and flange 3 respectively. The members 11 and 12 being drawn together by the nut 19, the packing flange 4 is held at its sides by the sides of the rabbets 22 with a clamp fit, while the sides of the flange 3 and body 2 are held by the sides of the rabbets 21 and 20 with only a snug fit to allow for expansion of the flange 3 and body.

When the piston moves to the right, water passes through the port 24 into the groove 6 and causes the right end of the packing to expand against the interior surface of cylinder 25 and wipe said surface clean ahead of the packing whereby dirt and grit are prevented from entering between the packing and cylinder and wearing the same.

When the piston moves to the left, water passes through the port 23 into the groove 5 and causes the left end of the packing to expand against the inner surface of the cylinder and wipe said surface clean, whereby dirt and grit are prevented from entering between the piston and cylinder and wearing the same in like manner.

It will also be seen that when the water passes into the grooves 5 and 6 the flanges 3 are caused to press on their respective shoulders 27, thus sealing the adjacent surfaces together to prevent leakage of water to the opposite sides of the piston as it moves to the right and to the left as hereinbefore described.

The engagement of the inner periphery of the packing body 2 with the shoulder 26 supports the ends of the body against the inner surface of the cylinder wall when the piston is reciprocated and prevents collapsing of said ends.

Having thus described my invention what I claim is:

1. In combination with a piston, a piston rod formed with a shoulder, and a nut on the end of said rod, the piston being formed in two members through which the rod extends with its shoulder engaging the outer end of one member and said nut engaging the outer end of the other member for drawing said members together, the inner faces of said members being each provided with three annular rabbets of progressively decreasing depths and diameters the outermost rabbets extending inwardly from the peripheries of the members, the members being provided respectively with ports extending from their outer ends into their intermediate rabbets, a resilient ring packing formed with an annular body, an internal intermediate flange of less width than said body extending from said body, an inner flange of less width than said intermediate flange extending inwardly from the latter flange, the intermediate flange being provided with annular grooves in its sides, said packing fitting between said members with its body fitting in said outermost rabbets with a snug fit, said intermediate flange fitting in said intermediate rabbets with a snug fit with said grooves coinciding with said ports, and said innermost flange fitting in said innermost rabbets with the side walls of said rabbets engaging the side walls of said innermost flange with a clamp fit.

2. In combination with a piston, a piston rod formed with a shoulder, and a nut on the end of said rod, the piston being formed in two members through which the rod extends with its shoulder engaging the outer end of one member and said nut engaging the outer end of the other member for drawing said members together, the inner faces of said members being each provided with three annular rabbets of progessively deceasing depths and diameters, the outermost rabbets extending inwardly from the peripheries of the members, the members being provided respectively with ports extending from their outer ends into their intermediate rabbets, a resilient ring packing formed with an annular body, an internal intermediate flange of less width than said body extending from said body, an inner flange of less width than said intermediate flange extending inwardly from the latter flange, the intermediate flange being provided with annular grooves in its sides, said packing fitting between said members with its body fitting in said outermost rabbets with a snug fit, said intermediate flange fitting in said intermediate rabbets with a snug fit with said grooves coinciding with said ports, and said innermost flange fitting in said innermost rabbets with the side walls of said rabbets engaging the side walls of said innermost flange with a clamp fit, the outermost rabbet forming a peripheral shoulder engaged by the inner surface of the ends of the body to support said ends against the cylinder wall and to prevent collapsing of said ends.

3. In combination with a piston, a piston rod formed with a shoulder, and a nut on the end of said rod, the piston being formed in two members through which the rod extends with its shoulder engaging the outer end of one member and said nut engaging the outer end of the other member for drawing said members together, the inner faces of said members being each provided with three annular rabbets of progressively decreasing depths and diameters, the outermost rabbets extending inwardly from the peripheries of the members, the members being provided respectively with ports extending from their outer ends into their intermediate rabbets, a resilient ring packing formed with an annular body, an internal intermediate flange of less width than said body extending from said body, an inner flange of less width than said intermediate flange extending inwardly from the latter flange, the intermediate flange being provided with annular grooves in its sides, said packing fitting between said members with its body fitting in said outermost rabbets with a snug fit, said intermediate flange fitting in said intermediate rabbets with a snug fit with said grooves coinciding with said ports, and said innermost flange fitting in said innermost rabbets with the side walls of said rabbets engaging the side walls of said innermost flange with a clamp fit, the intermediate rabbet forming a peripheral shoulder engaged by the inner surface of the intermediate packing flange to form a seal against the passage of liquid from one side of the piston to the other.

In testimony whereof I affix my signature.

LOUIS J. SMITH.